US011982489B2

United States Patent
Gray et al.

(10) Patent No.: US 11,982,489 B2
(45) Date of Patent: May 14, 2024

(54) AUTOMATED TEMPERATURE LOGGING AND PREDICTIVE ALERTING SYSTEM WITH TIMED LOGS

(71) Applicant: CM SYSTEMS, LLC, Lawrenceville, GA (US)

(72) Inventors: Robert Bradford Gray, Athens, GA (US); Thomas Gibson Woodbury, Holladay, UT (US); Mary Nicole Veitch, Bogart, GA (US)

(73) Assignee: CM SYSTEMS, LLC, Lawrenceville, GA (US)

( * ) Notice: Subject to any disclaimer, the term of this patent is extended or adjusted under 35 U.S.C. 154(b) by 498 days.

(21) Appl. No.: 17/169,276

(22) Filed: Feb. 5, 2021

(65) Prior Publication Data
US 2021/0247134 A1    Aug. 12, 2021

Related U.S. Application Data

(60) Provisional application No. 62/970,970, filed on Feb. 6, 2020.

(51) Int. Cl.
*F25D 29/00* (2006.01)
*G01K 13/00* (2021.01)

(52) U.S. Cl.
CPC ........... *F25D 29/008* (2013.01); *G01K 13/00* (2013.01); *G01K 2213/00* (2013.01)

(58) Field of Classification Search
CPC ............. F25D 29/008; F25D 2400/361; F25D 2600/06; F25D 2700/06; F25D 2700/14;
(Continued)

(56) References Cited

U.S. PATENT DOCUMENTS 7,275,863 B1 * 10/2007 Akers ................... G01K 3/04
374/E11.006
10,859,443 B1 * 12/2020 Zhang ................... G01D 9/32
(Continued)

OTHER PUBLICATIONS

CM Systems, LLC. "Notification of Transmittal of the International Search Report and the Written Opinion of the International Searching Authority, or the Declaration". PCT/US2021/016935. 7 pages. International Filing Date: Feb. 5, 2021, dated Jun. 4, 2021.

*Primary Examiner* — Jeffrey P Aiello
(74) *Attorney, Agent, or Firm* — Perilla Knox & Hildebrandt LLP; James J. Rha

(57) ABSTRACT

Disclosed are various embodiments for an automated temperature logging and predictive alerting system for monitoring items that are being cooled or heated. In one embodiment, a predictive logging application may compare a predicted temperature curve of an item to a predefined slope to predict whether or not the item will meet a target threshold. The target threshold may be a target temperature or duration rule that can be aggregated discontinuously over a single day or multiple days. If the projected temperature curve is predicted to not meet the target threshold, the logging application may send alerts notifying a client of available corrective actions. In projecting the predicted slope, the predictive logging application may train machine learning models to analyze historical data associated with the item and the user.

20 Claims, 14 Drawing Sheets

(58) Field of Classification Search
CPC ........ F24C 7/085; G01K 1/022; G01K 13/00; G01K 2207/04; G01K 2213/00; G01K 7/42; H04L 12/2816; H04L 2012/2847
USPC .......... 340/6.1, 584; 361/35, 103; 700/9, 28, 700/30, 32, 47–48; 702/1, 19, 60, 83, 85, 702/104, 130, 132, 136, 179, 182–183, 702/185–186, 188–189
See application file for complete search history.

(56) References Cited

U.S. PATENT DOCUMENTS

| | | | |
|---|---|---|---|
| 2003/0188677 A1* | 10/2003 | Akers | G01K 3/04 |
| | | | 374/E3.004 |
| 2014/0046722 A1* | 2/2014 | Rosenbloom | G06Q 10/06 |
| | | | 702/19 |
| 2015/0120586 A1* | 4/2015 | Schechter | G06Q 30/018 |
| | | | 705/317 |
| 2017/0146287 A1* | 5/2017 | Rezayat | F25D 13/00 |
| 2019/0265082 A1* | 8/2019 | Zafar | G01D 11/245 |
| 2020/0170264 A1* | 6/2020 | Wu | G01N 33/12 |

* cited by examiner

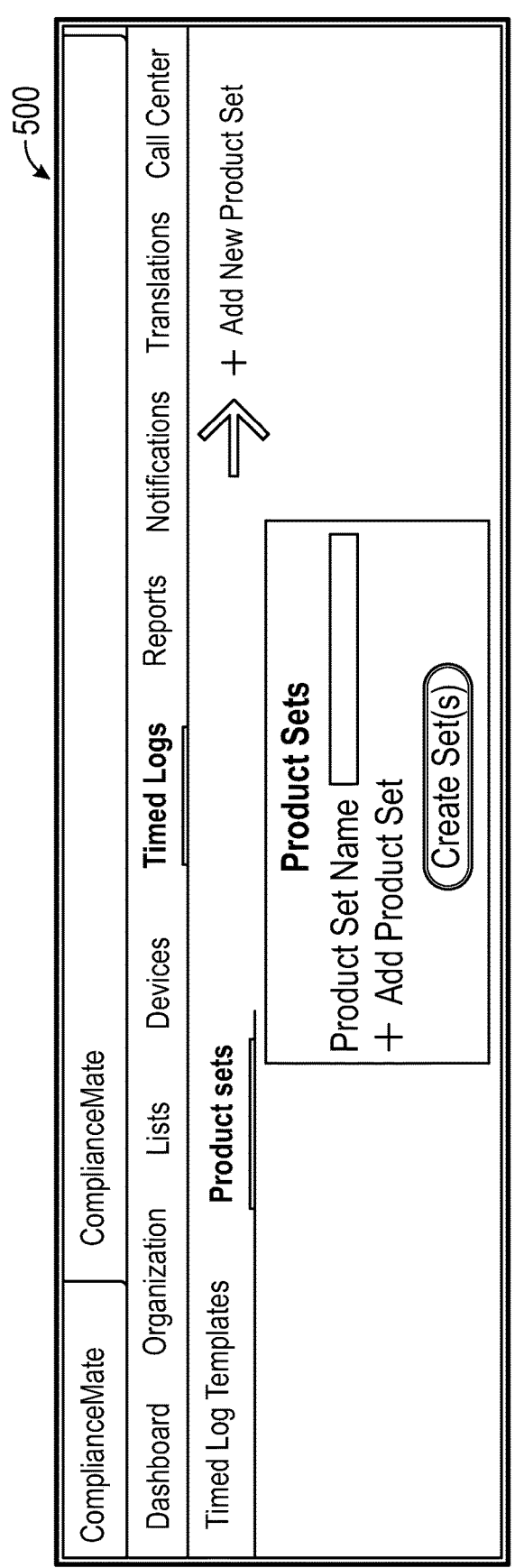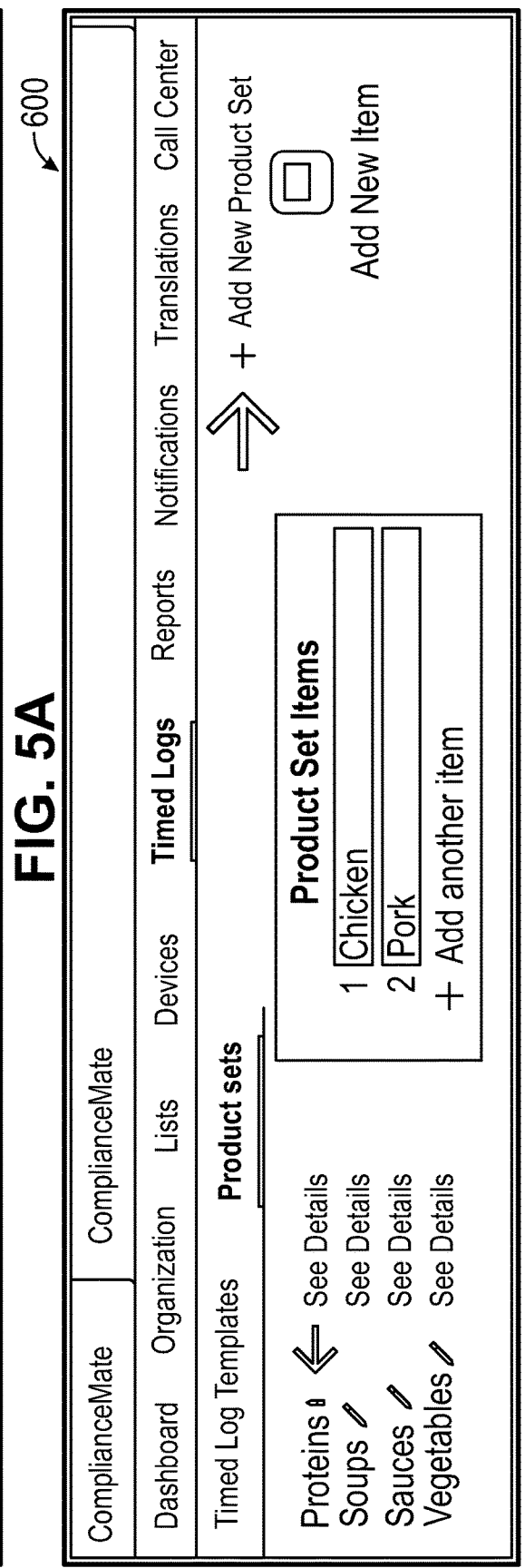

Template Name [Cooling Log]　　Type of Template [Automatic]

Product Sets
[Proteins ▼]
+ Add another set

Rules: Target Temperatures by Time　—149　　Target Temp by Time Corrective Actions
Time: Hours　Time: Minutes　Target Temperature
[0 hr ▼]　[0 min ▼]　[　　　]　☑ Apply Target Corrective Actions
+ Add another rule 1 [Reheat item and begin new cooling log]
2 [Discard Product]
+ Add another Corrective Action　143

Rules: Temperatures by Time Duration　　　　　　　Time Duration Corrective Actions
Temperatures cannot be between [　] and [　]
for more than [0 hr ▼]　☑ Apply Rule Correctives Actions
+ Add another rule 1 [Discard Product]
+ Add another Corrective Action Manual Alert Frequency
[0 min ▼]
Description
[　　　　　　　　　　]
[B I U abc style ▼ ≡ ≡ ⌒ ◯ ⊕]

Configuration Options
☑ Allow text item name
☑ Allow user comments
☑ Add user name
☑ Add Final Cooking Time and Temperature

[Save]

FIG. 6

Sensor Timed Logs — Save

146
— Log Template: Cooling Log
Item: Chicken

109
— Cooling Sensor: Sensor #1

Item name if not listed:

Comments:

User Name:

| ← Timed Logs | Save |

146
Log Template | Cooling Log ▼
Item | Chicken
Item name if not listed | ✏
Comments | ✏

User Name | ✏

AUTOMATED TEMPERATURE LOGGING AND PREDICTIVE ALERTING SYSTEM WITH TIMED LOGS

CROSS-REFERENCE TO RELATED APPLICATIONS

This application claims priority to, and the benefit of, U.S. Provisional Patent Application No. 62/970,970, entitled "AUTOMATED COOLING LOG," filed on Feb. 6, 2020, the entire contents of which is fully incorporated herein by reference.

BACKGROUND

Items that need to be cooled or heated generally need to follow a set of regulated guidelines in order to ensure quality and safety for consumers. Generally, these regulated guidelines are set by the Food and Drug Administration (FDA) Food Code of the United States and can encompass a wide variety of foods. Although these guidelines exist, there may be difficulties on accurately keeping track of an item's cooling or heating history throughout the lifetime of the item. Additionally, there may be difficulties in notifying a user once an issue arises with the cooling or heating of the item.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 5A illustrates an example product set creation user interface rendered on the client device.

FIG. 5B illustrates an example product set item creation user interface rendered on the client device.

FIG. 6 illustrates an example template modification user interface rendered on the client device that can be utilized by a user to customize a selected template.

FIG. 7 illustrates an example automatic timed log user interface rendered on the client device that can be utilized to initiate an automatic timed log.

FIG. 8 illustrates an example manual timed log user interface rendered on the client device that can be utilized to initiate an automatic timed log.

DETAILED DESCRIPTION

Figure 1:
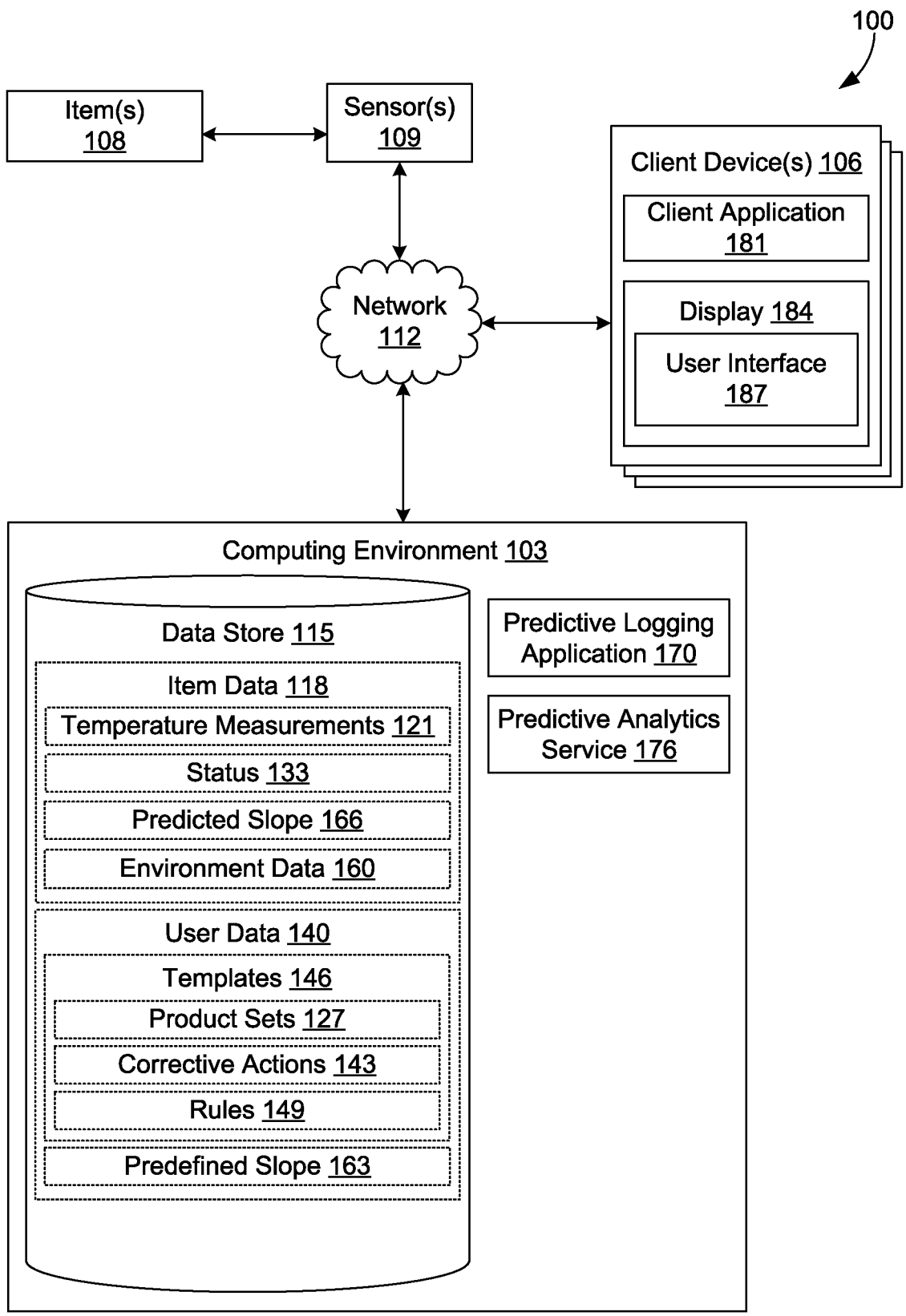
FIG. 1 is a drawing of a networked environment according to various embodiments of the present disclosure.

The present disclosure relates to a predictive temperature logging and notification system for use in monitoring temperatures of items as they are cooled or heated. Operators such as restaurant chains, food processors, and local restaurants, among others, encounter situations where they have to either heat or cool food related items on a daily basis. For these operators, being able to accurately track the temperature of an item that is being cooled or heated and receive notifications when temperatures fall or rise to undesired levels may greatly improve operations and reduce loss of resources. For example, a cafeteria may handle large quantities of food related items on a daily basis by first putting out items for the day's customers. Leftover items are then stored in a cooler or refrigerator of some sort, and then reheated to be served to future customers.

Another example may involve a food distributor that batch prepares products to ship out to various customers. For instance, a food distributor may batch prepare soups to ship out to various customers at various locations. The food distributor may have to heat the batch prepared soups to a required temperature, and then cool the batch prepared soups to a required temperature in a certain timeframe, so that the soups may reach the intended locations without being spoiled. Therefore, the food distributor may want to know the cooling rate or heating rate of the batch prepared item so that the food distributor can ascertain whether to add to or remove from the quantity of the batch prepared item. In these cases, operators may have to cool or heat such items for storage purposes so that these items may be used in the future. Additionally, these operators must meet guidelines set by regulatory agencies such as the Food and Drug Administration (FDA) when it comes to adequately cooling or heating these items.

Another example may involve shipping and transporting wines. Wine is a perishable product that can turn foul when exposed to extreme temperatures. Generally, the hotter the wine is stored, the quicker it will age. In addition, if the internal bottle temperature of a wine rises above 80° F., the wine can begin to deteriorate. If wine is subject to freezing (typically at internal temperatures of around 20-22° F.), the wine, the cork, and the bottle may damage. Therefore, one must pay careful attention to the ambient conditions when storing wine. Also, one would not want the internal temperature of the wine while being transported to fall below freezing or reach 80° F. or higher for any length of time while in transit.

A further example involving a food related product may involve ice creams. Ice cream is a fragile product that needs to remain below freezing at all times, protected from ambient heat during transport. If ice cream is exposed to temperatures above freezing, it can melt. Ice cream that has melted has a chance of becoming tainted from bacteria, which can result in overflowing from inside the tub the ice cream was packed in, and a loss of consistency. In addition, ice cream that has been re-frozen becomes more crystallized due to evaporation, ruining the flavor that consumers expect from a particular ice cream.

In other cases, operators may have to heat and cool foods multiple times in a single day. For example, a buffet restaurant typically has a variety of foods that it prepares to serve to customers. The buffet restaurant may typically batch prepare an amount for each food item that it thinks it would need for the entire day and store the food items initially in a cooler. The buffet restaurant may then need to heat a stored food item periodically throughout the day to serve to customers based on need. The buffet restaurant may also have to reheat a food item multiple times throughout the day based on availability of the food item and demand. Typically, the buffet restaurant may prepare a limited quantity of a particular dish to be served at lunch. However, there may be a large quantity of leftovers, which may need to be served by the end of the night or be tossed out. In such a case, the buffet restaurant may need to cool the particular dish, and then reheat to serve for dinner.

In some cases, operators may handle other time and temperature sensitive items such as medical products and transplant organs that need to be cooled appropriately according to set guidelines. Medical products may include vaccines, blood, insulin, medical devices, blood products like plasma, and other pharmaceutical products. Pharmaceuticals such as HIV (human immunodeficiency virus) antiretroviral drugs require constant storage in a controlled temperature generally not exceeding 25-30° C. or 77-86° F. Inadvertent exposures to high temperatures and humidity can affect the potency of HIV antiretroviral drugs. Therefore, such drugs must be monitored carefully to ensure potency and efficacy.

In instances involving transplant organs, a medical team must first remove an organ from the donor, and then prepare the harvested organ for transportation to the recipient who may be hours away by plane. Most organs are placed in static cold storage after they are harvested, or in a cooler full of ice, for preservation until the harvested organ reaches the recipient. The temperatures of the harvested organs must generally stay between 32-39° F. so that cell metabolism can slow and viability be extended. Therefore, an accurate temperature logging system that can predictively alert a user in cases where an item is predicted to not meet a target temperature or duration threshold can be greatly beneficial in ensuring the efficacy of pharmaceuticals and viability of harvested organs.

However, some difficulties may arise during instances such as at night or on weekends when no employee is on-site where these items are being stored or during other time-sensitive periods such as during transit. It is desirable to operators to be able to accurately track these items during the cooling or heating process, even when no employee is present at the storage site or while the items are in transit. Further, it is desirable to be notified promptly if any issues arise during the cooling or heating process. The cooling or heating process of these items is highly time sensitive because operators may only be given a certain amount of time to respond before incurring any loss to their products. As described above, these items may range from food items such as poultry being stored at a local restaurant overnight, and waiting to be served the following business day, to pharmaceuticals such as medications, and even transplant organs, among others. In such cases, responding too late to any issues related to the cooling or heating of these items may result in loss of these items, resulting in further waste of precious time and resources. In any of the cases described above, a system that can accurately track the temperature of an item and send alerts when temperatures fall or rise to undesired levels can be greatly beneficial in improving operations and reducing loss of resources.

Generally, food related items have cooling or heating guidelines that need to be followed before being deemed adequate to serve to customers. For example, these items generally need to adhere to the two-stage cooling process outlined by the FDA Food Code and ServSafe® standards. An example of the two-stage cooling process includes cooling from 135° F. to 70° F. within two hours at stage one, and from 70° F. to 41° F. within four hours at stage two. Stage one may be progressed through faster than the allotted time, and any additional time remaining may be added to the time requirements in stage two. For example, if stage one was accomplished in one hour, stage two may be accomplished within five hours instead of four. However, in this scenario, stage one may not exceed two hours. If it does or if 70° F. is not reached in two hours, the food product must be reheated to 165° F. (no matter the original safe cooking temperature) or discarded.

In addition, food related items generally may not be placed in a walk-in or reach-in cooler right away to cool once pulled from an oven. A roasted whole chicken, for example, pulled from the oven at 165° F., must first be cooled through other means before being placed in a cooler such as a refrigerator, freezer, or industrial cooler. For example, a roasted whole chicken pulled from an oven at 165° F. may be cooled at room temperature until the roasted whole chicken reaches 70° F., Once the roasted whole chicken reaches 70° F., then operators may place the roasted whole chicken into a cooler for further cooling, such as for stage two of the two-stage cooling process described above. Operators can generally place food items into a cooler when the food item reaches 70° F.

According to various embodiments of the present disclosure, a predictive logging application can track the temperature and status of an item through one or more sensors communicatively coupled to the item. The sensors may be coupled to the item or located proximately from the item for communication purposes. A predictive analytics service may be employed to compare predefined slopes to predicted slopes of the item. Through this comparison, the predictive logging application can predict whether the predicted slope will meet a target threshold. In the case that the projected temperature curve is predicted to not meet the target threshold, the predictive logging application may alert a user that corrective actions are available. Target thresholds may comprise a target temperature or a target duration of a range of temperatures defined by rules set by the user. An alert that indicates that the item is predicted to not meet the target threshold may create ample opportunity for users to respond with appropriate measures. It should be noted that "items" as used throughout this disclosure may refer to various food related products, packaging containing food related products, medical products, and other temperature and time sensitive items as can be appreciated.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by predictively alerting a user that one or more corrective actions are available in response to determining an item is not predicted to meet a target threshold; (2) improving the user experience in interacting with a computer system by providing a user with access to a user interface that allows them to customize and streamline the monitoring process; (3) improving the functioning of the computing system through an improved monitoring and alerting process that reduces inventory loss for a user during a cooling or heating process, and so forth. In the following discussion, a general description of the system and its components is provided, followed by a discussion of the operation of the same.

With reference to FIG. 1, shown is a networked environment 100 according to various embodiments. The networked environment 100 includes a computing environment 103, one or more client devices 106, one or more items 108, and one or more sensors 109, which are in data communication with each other via a network 112. The network 312 includes, for example, the Internet, intranets, extranets, wide area networks (WANs), local area networks (LANs), wired networks, wireless networks, cable networks, satellite networks, or other suitable networks, etc., or any combination of two or more such networks.

The one or more items 108 can include food related products, containers or packaging containing food related products that need to be cooled or heated, pharmaceuticals and transplant organs, temperature-sensitive vaccines such as messenger ribonucleic acid (mRNA) vaccines, and other time and temperature sensitive products. For example, food related products can include products such as poultry, meats such as beef and pork, fish, soups, vegetables, ice cream, etc. The sensors 109 may include temperature probes or monitoring devices such as thermocouples (T/Cs), resistance temperature detectors (RTDs), thermistors, or infrared (IR) sensors. The sensors 109 can be configured to extract temperature measurements 121 from the items 108. The sensors 109 can also extract environment data 160 surrounding the item 108, such as relative humidity, ambient temperature, and other environment characteristics that can affect the rate of cooling or heating. The sensors 109 may communicate with the network 112 through WiFi, Bluetooth®, near-field communication (NFC), radio-frequency identification (RFID), wireless infrared, ultra wideband, wireless induction, long range (LoRa), Z-Wave®, ZigBee®, etc.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various implementations. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a predictive logging application 170, a predictive analytics service 176, and other applications, services, processes, systems, engines, or functionality not discussed in detail herein. The predictive logging application 170 is executed to monitor temperature measurements of the item 108 that is being cooled or heated. The predictive logging application 170 may receive the temperature measurements from the one or more sensors 109 communicatively coupled to the item 108, and compute a cooling and/or heating rate to be expected by the item 108. With the cooling and/or heating rate, the predictive logging application 170 can project a predicted temperature slope or curve of the item 108. The predictive logging application 170 may also utilize the predictive analytics service 176 to tailor or improve the accuracy of the predicted temperature slope through training of machine learning models.

The data stored in the data store 115 includes, for example, item data 118 of the item 108, user data 140, and potentially other data. The item data 118 includes current and historical temperature measurements 121, status 133 the predicted slope 166, and the environment data 160. The status 133 of the item 108 can be linked to a machine-readable identifier that may be affixed to the item 108 or in proximity of the item 108, such as bar codes, quick response (QR) codes, radio-frequency identifiers (RFIDs), near-field communication (NFC) tags, and/or other forms of identifiers. Once a user scans the machine-readable identifier or otherwise activates the identifier, the user's client device 106 may display the status 133 of the item 108. The status 133 may include information such as date and time of when the item 108 was received at the storage location, how many times the item 108 has been cooled and/or heated, a batch number, expiration date, etc. If the item 108 has been cooled and/or heated before, the item data 118 may include the historical temperature measurements 121 monitored during a previous cooling and/or heating process.

The predicted slope 166 may include projected temperature curves or slopes the item 108 is expected to follow while being cooled and/or heated. The predictive logging application 170 may initially compute a cooling and/or heating rate based on the temperature measurements 121 sent by the one or more sensors 109. With the cooling and/or heating rate, the predictive logging application 170 may compute the predicted slope 166 for the user to view through the client device 106. The environment data 160 may include data about the environment the item 108 is in while being monitored, such as relative humidity, ambient temperature, and potentially other data.

The data store 115 can also store user data 140 of a user, such as templates 146 and predefined slopes 163. The user may customize the templates 146 through a client application 181 by specifying product sets 127, corrective actions 143, and rules 149. To this end, the templates 146 correspond to customizable models created through the client device 106 that can be selected by the user to initialize the monitoring process. In the initial phases of customizing the templates 146, the user may specify whether the templates 146 are a manual type of template or an automatic type of template. If the user specifies a manual type of template, the user may have to manually temp the item 108 each time the user wants a temperature reading through the client device 106. If the user specifies an automatic type of template, then the temperature of the item 108 may be taken automatically at set intervals without the user having to interact with the client device 106.

Within the templates 146, the user may specify product sets 127 the templates 146 correspond to. For example, the user may need to monitor the temperatures of grilled pork, beef, and chicken. If the user desires, the user can group these three different types of meats as a protein product set 127, with each type of meat saved as a "product set item," and save this information under a new template 146. To this end, the new template 146 now pertains to "proteins," and the user may use the new template 146 when monitoring these three types of meats. Product sets 127 and product set items are highly customizable, and the user may save within the template 146 what product sets 127 the templates 146 pertain to.

The corrective actions 143 include alerts that are triggered when the item 108 being monitored does not meet a target threshold defined by the rules 149. In addition the corrective actions 143 may be triggered when the item 108 is not predicted to meet the target threshold as determined by the predictive logging application 170 and the predictive analytics service 176. For example, a user may create an ice cream template 146 for monitoring a batch of ice cream containers. The user may want to know what the optimal number of ice cream containers in a cooler can be without sacrificing the cooling properties of the cooler. To find out, the user may place a large quantity of ice cream containers 108 in the cooler. Only a select few ice cream containers 108 may be coupled to a sensor 109. The user may specify in the ice cream template 146 that the rule 149 is that the select few ice cream containers 108 have to remain below 32° F. for a period of at least 8 hours. If at any point before the 8 hours are up the select few ice cream containers 108 fall below 32° F. the user is notified of available corrective actions 143, which may include halting or shutting down the predictive logging application 170, restarting the monitoring process of the select few ice cream containers, and/or other options. In some embodiments, triggering of the corrective actions 143 may automatically terminate the predictive logging application 170.

A user may also define the corrective actions 143 to be applied to the templates 146. For example, the user may create a template 146 and also a liquids product set 127 with the template 146. In the liquids product set 127, the user may specify sodas, dairy products, and juices as product set items. Within the template 146, the user may create corrective actions 143 to be applied to each or all of the product set items. The corrective actions 143 may include an alert stating to the user that the monitoring of the product set items has been terminated. Other alerts may give the user selectable options on the client device 106 such as options stating "reheat item and begin new timed log" or "discard item," In some embodiments, the triggering of the corrective actions 143 may cause the predictive logging application 170 to terminate or pause monitoring of the item 108 automatically Non-limiting examples of the rules 149 include a target temperature by time rule and a target temperature by time duration rule. The target temperature by time rule generally includes a predefined target temperature that the item 108 has to reach within a certain timeframe (e.g., a batch of chicken must reach 50° F. within 3 hours). The target temperature by time duration rule generally includes a predefined temperature range that the item 108 cannot be in for a set amount of time (e.g., a batch of chicken cannot be between 70° F. and 50° F. for more than 3 hours). Users may further define the rules 149 depending on what the item 108 is and save the rules 149 to the templates 146. The rules 149 may be expanded to cover additional scenarios relating to the target temperature by time rule and the target temperature by time duration rule.

For example, a user may specify pharmaceutical rules 149 for a pharmaceutical 108 that allows the target temperature by time duration rule to be extended across multiple days. The user may specify that the pharmaceutical 108 cannot be between 70-90° F. for more than three hours, but those three hours may be aggregated continuously or discontinuously. If discontinuous, the three hours may be cumulative over a period of consecutive or non-consecutive days. For instance, if the pharmaceutical 108 was between 70-90° F. for one hour on day one, one hour on day two, and one and a half hours on day three, the pharmaceutical 108 would not satisfy the pharmaceutical rules 149. To summarize, a user can customize the temperature by time duration rule to only apply within a certain time period in a single day, or within a certain time period covered across multiple days. The rules 149 a user specifies for an item 108 may be saved to a corresponding template 146, and the predictive logging application 170 can load the corresponding template 146 to begin the monitoring process of the item 108.

The predefined slopes 163 include slopes or curves that the item 108 is expected to follow as the item 108 is being cooled or heated. A user may have a plurality of predefined slopes 163 stored in the data store 115 to be utilized depending on what the item 108 being monitored is. For example, a predefined cooling slope 163 of beef may be different from a predefined cooling slope 163 of ice cream. Further, the predictive logging application 170 can utilize the predictive analytics service 176 to compare the predefined slopes 163 to the predicted slopes 166. These comparisons allow the predictive logging application 170 to make predictions on whether the item 108 will reach a target threshold defined by the rules 149 set by the user.

In various embodiments, the predictive analytics service 176 may train a variety of machine learning models to aid in projecting a time-based cooling and/or heating curve of the item 108. The predictive logging application 170 can compute a cooling and/or heating rate of the item 108 based on received temperature measurements 121 to compute a time-based cooling and/or heating curve expected by the item 108. In addition, the accuracy of this cooling and/or heating rate may be improved through machine learning models. For example, if the item 108 has been cooled and/or heated before (e.g., same type of chicken has been cooled before, same pharmaceutical has been cooled before, same transplant organ has been cooled before, etc.), the predictive analytics service 176 may utilize historical item data 118 (e.g., temperature measurements, predicted slopes, characteristics of the food such as thickness and density, and environment data from previous monitoring sessions) of the item 108 to train machine learning models that can be used in conjunction with the cooling and/or heating rate to project a predicted slope 166 of the item 108 to a certain period of time. If a template 146 selected by a user for the item 108 specifies a product set 127, the predictive analytics service 176 may analyze historical item data 118 of other product set items in the product set 127 in training the machine learning models. The predictive logging application 170 may identify that the item 108 has been cooled and/or heated before based on the template 146 selected by the user if the template 146 was selected when monitoring the item 108 in the past.

In some embodiments, the predictive logging application 170 may identify that the item 108 has been cooled or heated before by a current user or another user by simply scanning the data store 115. In such a case, the predictive logging application 170 may communicate to the predictive analytics service 176 that the item 108 exists in the data store 115. The predictive logging application 170 can then analyze the historical item data 118 of the item 108 to tailor the cooling and/or heating rate computed by the predictive logging application 170. The predictive analytics service 176 may train various machine learning models to utilize the historical item data 118 to predict a more accurate rate of cooling or heating expected by the item 108. With the utilization of the predictive analytics service 176, the predictive logging application 170 can project the predicted slope 166.

The predictive logging application 170 can process the temperature measurements 121 so that a user may view the temperature measurements 121 on the client device 106 as a function of time. In some embodiments, the client application 181 may process the temperature measurements 121 instead of the predictive logging application 170 and vice versa. The sensors 109 may be configured to extract the temperature measurements 121 from the specific item 108 and transmit the temperature measurements 121 through the network 112 for a set period of time set by the user, or until the predictive logging application 170 indicates the sensors 109 to stop extracting temperature measurements 121.

In other embodiments, the predictive analytics service 176 may analyze historical item data 118 of similar items related to the item 108 to project the predicted slope 166. For example, if the item 108 is a new item 108 that does not exist in the data store 115, the predictive analytics service 176 may utilize machine learning models created with historical item data 118 for the similar items related to the new item 108. The predictive analytics service 176 may determine the similar items based on user data 140 pertaining to the new item 108. For example, a user may have previously monitored pork and beef and created a new template 146 with a protein product set 127. Within the protein product set 127, the user may have listed beef and pork as product set items. Now the user wishes to monitor a new item 108, which is roasted chicken, and the user may choose to use the new template 146, and list the roasted chicken 108 as a product set item under the protein product set 127. Once the user starts monitoring the roasted chicken 108 and the predictive logging application 170 computes a temperature change rate, the predictive analytics service 176 may utilize machine learning models of the beef and pork, which are based on the historical item data 118 of the beef and pork, along with the temperature change rate to project a predicted slope 166 of the roasted chicken 108. If there is no similar item or historical data for a similar item available in the data store 115, then the predictive analytics service 176 may train a new machine learning model based on the gathered item data 118 of the new item 108.

The item 108 that is to be cooled or heated may bear one or more machine-readable identifiers, such as bar codes, quick response (CR) codes, radio-frequency identifiers (RFIDs), and/or other forms of identifiers. The machine-readable identifier may correspond to a unique identifier that may uniquely correspond to the item 108. The machine-readable identifier of the item 108, once activated, may provide the status 133 of the item 108. The status 133 of the item 108 may include various data about the item 108, such as date and time of when the item 108 was received at the storage location, how many times the item 108 has been heated or cooled, what batch the item 108 is part of, when the item 108 started being cooled or heated, shelf-life of the item 108, and/or other information.

Users may also define corrective actions 143 for the item 108, which may be implemented into the corresponding template 146. The corrective actions 143 are alerts that are triggered when the item 108 does not meet a target threshold defined by the rules 149 and/or when the predictive logging application 170 predicts the item 108 to not meet the target threshold. For instance, the corrective actions 143 for the item 108 may include an alert stating that the monitoring of the item 108 by the predictive logging application 170 has been terminated, and an alert that gets sent to the client device 106 with options stating "reheat item and begin new timed log" or "discard item." The triggering of the corrective actions may cause the predictive logging application 170 to terminate or pause monitoring of the item 108 in some instances.

In another instance, an alert corresponding to the corrective actions 143 may be sent to the client device 106 when the predictive logging application 170 predicts that the item 108 will not meet the target threshold set by the rules 149. In this type of situation, the alert may indicate to the client device 106 that the item 108 is predicted to not meet the target threshold and that the corrective actions 143 available include halting the predictive logging application 170, restarting the predictive logging application 170, and/or other options. Triggering of the corrective actions 143 may also cause the predictive logging application 170 to be terminated automatically because users will likely need to restart cooling of the item 108 or toss the item 108 altogether. However, the user may be able to configure the predictive logging application 170 so that the predictive logging application 170 is not automatically terminated when the corrective actions 143 are triggered.

The client devices 106 may be representative of a plurality of client devices that may be coupled to the network 112. Each of the client devices 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smart watches, or other devices. The client devices 106 may include a display 184. The display 184 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client devices 106 may be configured to execute various applications such as the client application 181 and/or other applications. In particular, the client application 181 may be employed so that a user may customize the templates 146. In customizing the templates 146, the user may specify the product sets 127, the corrective actions 148, and the rules 149 applicable to the templates 146. The client application 181 may be a specialized application or may be a general browsing or communication application. The client application 181 may be executed in the client devices 106, for example, to access network content served up by the computing environment 103 and/or other servers, thereby rendering a user interface 187 on the display 184. To this end, the client application 181 may comprise, for example, a browser, a dedicated application, etc., and the user interface 187 may comprise a network page, an application screen, etc. The client device 106 may be configured to execute applications beyond the client application 181 such as, for example, email applications, social networking applications, word processors, spreadsheets, and/or other applications.

The predictive logging application 170 and the predictive analytics service 176 may communicate with the client device 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 112.

Figure 2:
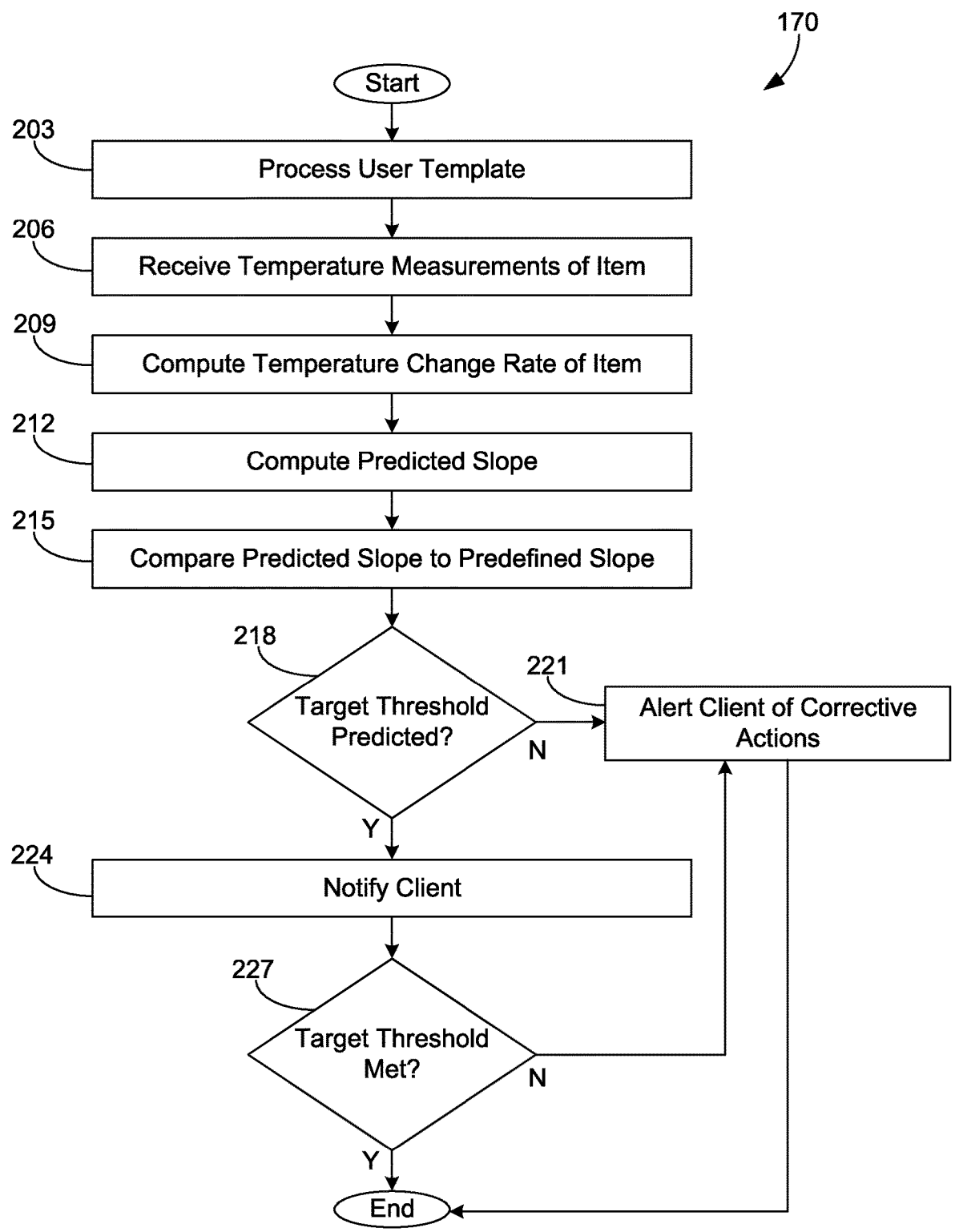
FIGS. 2 and 3 are flowcharts illustrating examples of functionality implemented as portions of a logging application executed in a computing environment in the networked environment of FIG. 1 according to various embodiments of the present disclosure.

Referring next to FIG. 2, shown is a flowchart that provides one example of a portion of the predictive logging application 170 according to various embodiments. It is understood that the flowchart of FIG. 2 provides merely an example of the many different types of functional arrangements that may be employed to implement the operation of the portion of the predictive logging application 170 as described herein. As an alternative, the flowchart of FIG. 2 may be viewed as depicting an example of steps of a method implemented in the computing environment 103 (FIG. 1) according to one or more embodiments.

Beginning with box 203, the predictive logging application 170 processes the templates 146 customized by a user. For example, the user may wish to monitor the cooling and/or heating of roasted chicken 108. The user may have created a new template 146 in the past to monitor the cooling and/or heating of roasted pork. Within the new template 146, the user may have specified a "protein" product set 127 and a "roasted pork" product set item. In monitoring the roasted chicken 108 the user may select the new template 146 on the client device 106 and specify a "roasted chicken" product set item under the protein product set 127.

In addition, the user may specify other parameters such as the corrective actions 143 and the rules 149 to be applied to the new template 146. The corrective actions 143 include alerts that are triggered when the item 108 being monitored does not meet a target threshold defined by the rules 149. Further, the corrective actions 143 may be triggered when the item 108 is not predicted to meet the target threshold as determined by the predictive logging application 170 and the predictive analytics service 176. The rules 149 may include a target temperature threshold and/or a target duration of a temperature range threshold. The target duration of a temperature range threshold is a rule that specifies that the item 108 cannot be in a certain temperature range for a set period of time. For example, the user may specify that the item 108 cannot be between 70-90° F. for more than three hours, but those three hours may be aggregated continuously or discontinuously. If discontinuous, those three hours may be cumulative over a single day, multiple consecutive days, or multiple non-consecutive days. Once the user finishes modifying the new template 146, the predictive logging application 170 is ready to process the new template 146 and initialize the monitoring process of the roasted chicken 108. Further, the user may have a single template 146 stored in the data store 115 or multiple templates 146 stored in the data store 115. To this end, the data store 115 may store a plurality of templates 146 from numerous users.

In box 206, the predictive logging application 170 receives the plurality of temperature measurements 121 of the item 108 as the item 108 is cooled and/or heated. The plurality of temperature measurements 121 are extracted by the one or more sensors 109 and transmitted to the computing environment 103 over the network 112. The one or more sensors 109 can be configured to extract the plurality of temperature measurements 121 over a set period of time as the user defines in the templates 146, or indefinitely until the corrective actions 143 are triggered. If the user specifies or selects a manual type of template 146, the one or more sensors 109 may extract the temperature measurements 121 and transmit them through the network 112 only at the direction of the user.

In box 209, the predictive logging application 170 processes the temperature measurements 121 to compute a temperature change rate of the item 108. The temperature change rate can be the cooling rate and/or heating rate of the item 108 while being monitored. The predictive logging application 170 may compute an updating temperature change rate as more temperature measurements 121 are received during the course of the monitoring process. For example, the predictive logging application 170 may receive sixty temperature measurements 121 of the item 108 in the course of an hour, one every minute. The temperature change rate may be a linear slope that best captures the sixty temperature measurements 121 as a function of time. A user may view the temperature change rate with the temperature measurements 121 in the form of a graph through the client device 106.

In box 212, the predictive logging application 170 processes the temperature change rate along with the historical item data 118 (e.g., temperature measurements, predicted slopes, characteristics of the food such as thickness and density, and environment data from previous monitoring sessions) of the item 108 to compute the predicted slope 166. For example, if the item 108 has been cooled and/or heated before (e.g., same type of chicken has been cooled before, same pharmaceutical has been cooled before, same transplant organ has been cooled before, etc.), the predictive logging application 170 may utilize the predictive analytics service 176 to train machine learning models with the historical item data 118. The machine learning models can be used in conjunction with the cooling and/or heating rate to project the predicted slope 166. The historical item data 118 of the item 108 may include temperature measurements, temperature change rates, and/or other information from a previous monitoring process.

In some embodiments, the historical item data 118 of the item 108 may span data of similar items related to the item 108. For example, if the item 108 is a new item 108 that does not exist in the data store 115 the predictive logging application 170 may utilize machine learning models trained with the historical item data 118 for the similar items related to the new item 108. The predictive logging application 170 may determine the similar items based on user data 140 pertaining to the new item 108. For example, a user may have previously monitored pork and beef and created a new template 146 with a protein product set 127. Within the protein product set 127, the user may have listed beef and pork as product set items. Now the user wishes to monitor a new item 108, which is roasted chicken, and the user may choose to use the new template 146, and list the roasted chicken 108 as a product set item under the protein product set 127. Once the user starts monitoring the roasted chicken 108 and the predictive logging application 170 computes a temperature change rate, the predictive logging application 170 may utilize machine learning models of the beef and pork, which are based on the historical item data 118 of the beef and pork, along with the temperature change rate to project a predicted slope 166 of the roasted chicken 108. If there is no similar item or historical data for a similar item available in the data store 115, then the predictive analytics service 176 may utilize the predictive analytics service 176 to train a new machine learning model based on the gathered item data 118 of the new item 108.

In projecting the predicted slope 166, current environment data 160 (e.g., ambient temperature, relative humidity of the air, etc.) of the item 108 may impact the machine learning models trained by the predictive logging application 170, as the current environment data can noticeably affect the temperature change rates of the item 108. For example, if a walk-in cooler cooling the item 108 experiences a drop in temperature or an increase in relative humidity, the cooling rate of the item 108 may be significantly slowed. The predictive logging application 170 may account for the changes in the cooler by updating the machine learning models to more accurately project the predicted slope 166.

In some embodiments, the predictive logging application 170 may analyze historical user data 140 to further tailor the machine learning models. For example, the predictive logging application 170 may scan the data store 115 to see if any data related to a user exists in the data store 115. Specifically, the predictive logging application 170 may scan the data store 115 to find templates 146 corresponding to the user. If there is a match, the predictive logging application 170 may analyze the data from the templates 146 to update the machine learning models used in projecting the predicted slope 166 based on correlation between similarity of items monitored with the templates 146 and the item 108.

In box 215, the predictive logging application 170 compares the predicted slope 166 to the predefined slopes 163 either selected by a user or automatically selected by the predictive logging application 170. The user may have various predefined slopes 163 stored in the data store 115 to be utilized depending on what the item 108 being monitored is. For example, if the user is a winery operator, the user may have a wine storage predefined slope 163 to be utilized in instances where cultivated wine has been bottled after the aging process and is ready to be shipped in a climate-controlled manner. The user may setup bottled wine 108 to be monitored by communicatively coupling one or more sensors 109 to the bottled wine 108 so that the temperature change rate of the bottled wine can be computed by the predictive logging application 170. Once a predicted slope 166 of the bottled wine 108 is computed, the predictive logging application 170 may compare the predicted slope 166 of the bottled wine to the wine storage predefined slope 163 to determine if the bottled wine 108 will meet a target threshold specified by the user. If the user saves the wine storage predefined slope 163 to a specific template 146, the predictive logging application 170 may utilize the wine storage predefined slope 163 automatically next time the user uses the specific template 146. The user may also save a plurality of predefined slopes 163 to the specific template 146, with each of the plurality of predefined slopes 163 having different temperature curve profiles if the user desires.

In various embodiments, the predictive logging application 170 may automatically compare the predicted slope 166 to various predefined slopes 163 stored in the data store 115 to identify a close match. If a close match is identified, then the item 108 is likely to be cooling and/or heating at an expected rate. If there is no match, the item 108 may be cooling and/or heating at an unexpected rate causing the predictive logging application to send an alert to the user.

In box 218, the predictive logging application 170 predicts whether the item 108 will meet a target threshold set by a user in the rules 149. The prediction is based at least in part on the comparison between the predicted slope 166 and the predefined slope 163 as described in box 215. If the predictive logging application 170 predicts that the item 108 will meet the target threshold defined by the rules 149, then the predictive logging application 170 proceeds to box 224. If the predictive logging application 170 predicts that the item 108 will not meet the target threshold, then the logging application proceeds to box 221.

In box 221, the predictive logging application 170 alerts the client device 106 that the item 108 is predicted to not meet a target threshold set by a user, and presents the user with selectable corrective actions 143 that are set by the user through the templates 146. The corrective actions 143 the user may set in each of the templates 146 include halting or shutting down the timed log monitoring process and/or starting a new timed log monitoring process. In some embodiments, triggering of the corrective actions 143 may automatically terminate the predictive logging application 170. Thereafter, the portion of the predictive logging application 170 ends.

In box 224, the predictive logging application 170 notifies the client device 106 that the item 108 is predicted to meet the target threshold during the timed log monitoring process. In box 227, the predictive logging application 170 ascertains whether the item 108 actually met the target threshold during the tinned log monitoring process. If the target threshold was met, the portion of the predictive logging application 170 ends. If the target threshold was not met, the predictive logging application 170 goes back to box 221 to notify the client device 106 of the same. Thereafter, the portion of the predictive logging application 170 ends.

Figure 3:
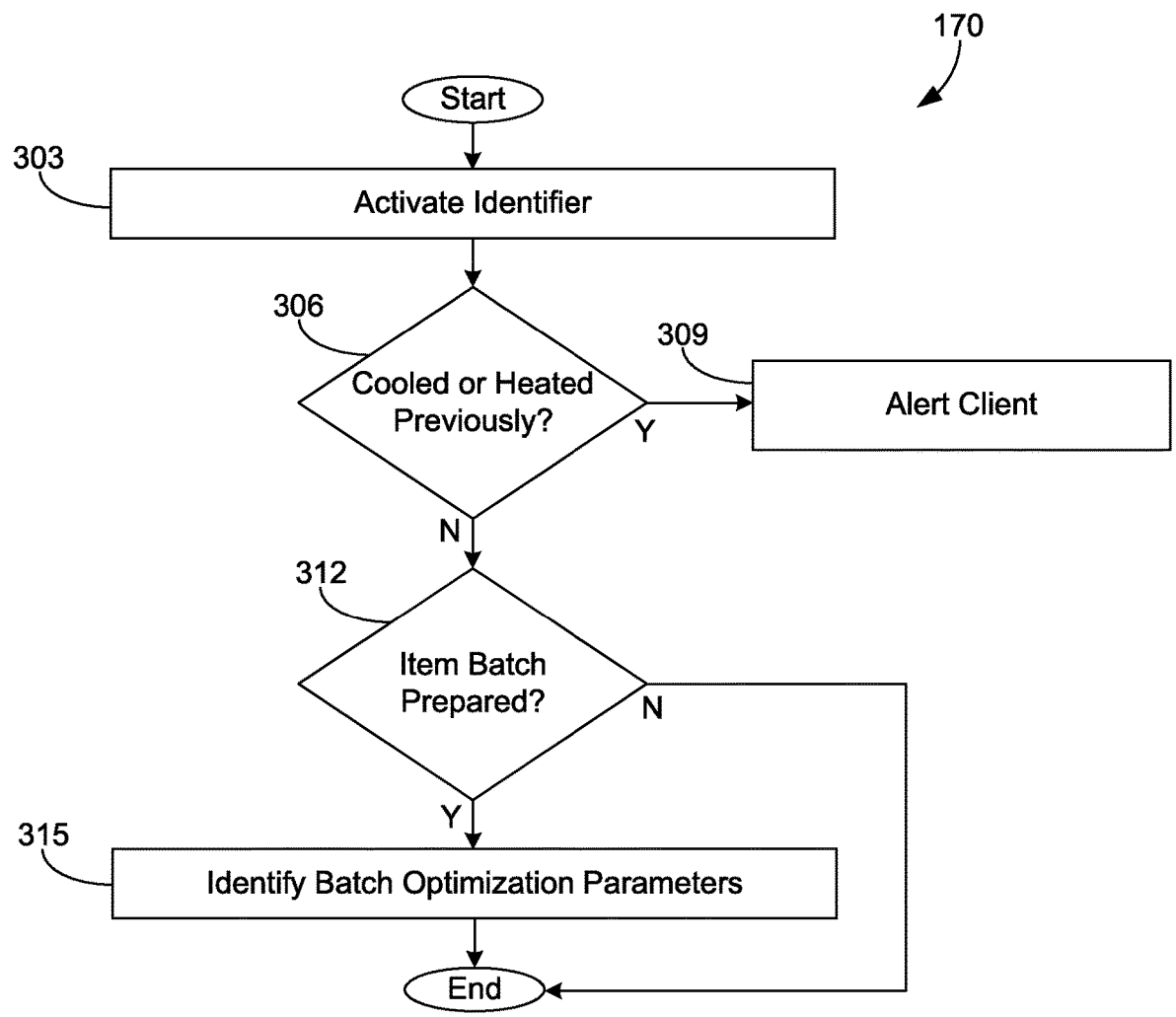

Referring next to FIG. 3, shown is a flowchart that provides one example of another portion of the predictive logging application 170 according to various embodiments. It is understood that the flowchart of FIG. 3 provides merely an example of the many different types of functional arrangements that may be employed to implement the operation of the portion of the predictive logging application 170 as described herein. As an alternative, the flowchart of FIG. 3 may be viewed as depicting an example of steps of a method implemented in the computing environment 103 (FIG. 1) according to one or more embodiments.

Beginning with box 303, the predictive logging application 170 initiates the logging process of the item 108 by scanning or activating a machine-readable identifier (e.g., bar codes, quick response (OR) codes, radio-frequency identifiers (RFIDs), near-field communication (NFC) tags, etc.) on the item 108. For example, the item 108 may be a liquid pharmaceutical item such as cough syrup 108 that was mass produced and then divided up into individual bags of cough syrup 108. Each individual bag 108 may have a machine-readable identifier affixed to it so that a user may scan or activate the identifier. Once the machine-readable identifier is activated, the predictive logging application 170 is able to access the item data 118 of the item 108 stored in the data store 115. If there already is a defined template 146 associated with the item 108, then the predictive logging application 170 may process the defined template 146 to initialize a timed log monitoring process.

In some embodiments, the predictive logging application 170 may alert a user to use the item 108 by a certain day to prevent discarding the item 108 depending on the data retrieved once the machine-readable identifier is activated. For example, a user who deals with a large quantity of chicken may receive an alert that notifies the user to use a specific batch of raw chicken by the current day when the user activates a machine-readable identifier placed in close proximity to the batch of raw chicken. To this end, some of the functionalities of the predictive logging application 170 may be configured from a central server to send alerts to the user. Although the predictive logging application 170 may automatically send out alerts to the user, an operator behind the central server may ascertain whether to alert the user based on data that is retrieved when the machine-readable identifier is activated. The alerts may be predicated on food safety concerns regarding spoilage and/or FDA guidelines.

In some cases, activating the machine-readable identifier may provide the user with additional detail related to the life cycle of the item 108, such as date and time of when the item 108 entered the system, shelf-life of the item 108, and/or other information. This additional detail may have been entered into the system by the user when the item 108 first arrived to the facility or by a distributor who shipped and transported the item 108 to the facility.

In box 306, the predictive logging application 170 is able determine whether the item 108 has been cooled and/or heated previously based on data stored in the data store 115. In the above example, if one of the individual bags of cough syrup 108 went through a cooling timed log monitoring process on a Monday and the current day is a Tuesday, a user who activates the machine-readable identifier on the individual bag of cough syrup 108 may be able to see on the client device 106 that the individual bag of cough syrup 108 went through a monitoring process on Monday. The user may also be able to access all relevant data stored in the data store 115 related to that monitoring process from Monday. Being able to see how many times the item 108 went through a cooling and/or heating monitoring process may be valuable to a user who needs to prioritize cooling and/or heating certain items. In the above example, if there is a limit on how many times the individual bags of cough syrup can be cooled, the user could make sure to not go over that limit when cooling the individual bags of cough syrup 108. Such information could substantially limit loss of resources and time for the user who may not have had a method of knowing whether the item 108 had been cooled and/or heated previously other than from manual methods.

In box 309, the predictive logging application 170 alerts the client device 106 of a user that the item 108 has been cooled or heated previously. The alert may be valuable to a user who needs to prioritize cooling and/or heating of certain items for safety reasons and also to reduce loss of resources. For example, buffet restaurants may typically cool and heat food items 108 multiple times in a single day or over the course of multiple days. Receiving alerts that specify how many times the food item 108 has been cooled and/or heated may allow the buffet restaurant to prioritize which food item 108 gets served to customers for food quality purposes, and in some cases, for food safety purposes. The alert may be a standardized alert that notifies the user or a customized alert if the user specified as such in a corresponding template 146 associated with the item 108. Furthermore, the user can specify in the corresponding template 146 of when to be alerted. For example, the user may specify in the corresponding template 146 to not be alerted until the item 108 has been through at least two timed log monitoring sessions. In addition, the user may receive an alert from the predictive logging application 170 to discard the item 108 if the item 108 has passed a threshold on how many times the item 108 can be cooled and/or heated.

In box 312, the predictive logging application 170 determines whether the item 108 has been batch prepared through data that becomes available once the corresponding machine-readable identifier is activated. Many operators will opt to batch prepare foods when preparing a large quantity of the item 108. In addition, cooling a large batch of a food product may result in loss or waste of product unless adequate measures are taken. If the item 108 is not batch prepared, the portion of the predictive logging application 170 ends. If the item 108 is batch prepared, the predictive logging application 170 proceeds to box 315.

In box 315, the predictive logging application 170 determines the batch optimization parameters for a batch prepared item 108. The batch optimization parameters can include an optimal cooldown rate of the batch prepared item 108 that yields a larger batch. For example, an ice cream distributor may wish to know an ideal quantity of ice cream containers that can be stored in a cooling location without compromising on food safety and quality. The ideal quantity may be a maximum amount that can be stored while still meeting target thresholds as set by a user. The ice cream distributor may initially store a large quantity of ice cream containers in a cooler, with one of the containers coupled to one or more sensors 109, as coupling all of the ice cream containers with an individual sensor may not be feasible. The ice cream distributor may then monitor the ice cream container to determine whether a target threshold is met according to set rules 149. The target threshold may not be met due to an excess amount of the ice cream containers being stored in a cooler. This can result in the ice cream containers not being cooled effectively, leading to potential food safety and quality issues. If the target threshold is not met, the ice cream distributor can adjust the quantity of the ice cream containers in the cooling location and go through the monitoring process again until the target threshold is met.

In some embodiments, the predictive logging application 170 can determine an optimal cooling section within a cooler for the batch prepared item 108. Not all areas within a cooler may have the same cooling characteristics, and some sections of the cooler may cool the batch prepared item 108 at a higher rate compared to other sections. With this information, a user may know exactly where in the cooler to place the batch prepared item 108 to achieve an optimized cooling rate. Further, the predictive logging application 170 may be able to determine an optimal arrangement of items within a cooling section that would result in a higher cooling rate.

The predictive logging application 170 may utilize the predictive analytics service 176 to train machine learning models with the data acquired from each monitoring process as described above. With a sufficient amount of data collected, the predictive logging application 170 can notify a user of an ideal quantity of the batch prepared item 108 that can be stored in a cooler to meet certain target thresholds. In determining the ideal quantity, the predictive logging application 170 may take into account the various cooling characteristics of the batch prepared item 108, such as its item data 118 and the cooling rate, that was used to train the machine learning models, To this end, the batch optimization parameters may include the ideal quantity of the batch prepared item 108 given certain cooling characteristics, such as its item data 118 and the cooling rate collected over past monitoring processes. In addition, the batch optimization parameters may be saved to a template 146 that was utilized during the monitoring process.

It is important to note that in some embodiments, the client application 181 may be able to perform the functionalities of the predictive logging application 170 and the predictive analytics service 176 as described herein. In other embodiments, the predictive logging application 170 may be executed from a central server, and data may be communicated to the client device 106.

Figure 4:
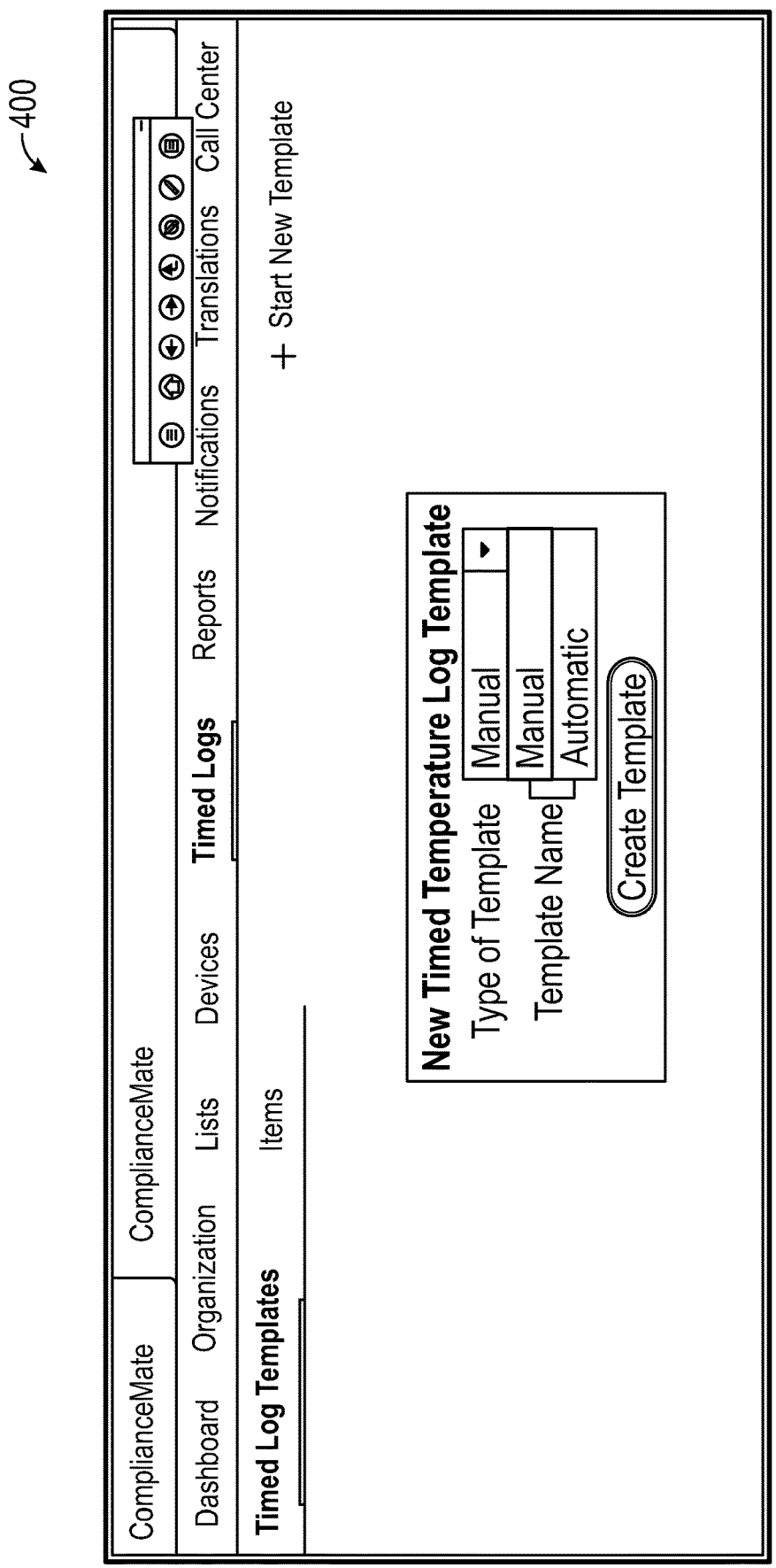
FIG. 4 illustrates an example template creation user interface rendered on a client device.

Moving onto FIG. 4, shown is an example template creation user interface 400 rendered on the display 184 of the client device 106. In the example template creation user interface 400, a user may select between a manual type of template or an automatic type of template. If the user selects a manual type of template, the user may have to manually direct the one or more sensors 109 to take the temperature measurements 121 through the client application 181 each time the user wants a temperature reading. The predictive logging application 170 may send alerts to the client device 106 periodically, reminding the user to retake a temperature the item 108 until the item 108 is sufficiently cooled or heated. If the user selects an automatic type of template, the sensors 109 may take the temperature measurements 121 automatically at set intervals defined by the user. Further, the user may also designate a template name.

FIGS. 5A and 5B illustrate an example product set creation user interface 500 and an example product set item creation user interface rendered on the client device 106. The product set creation user interface 500 may be used by a user to create the product sets 127. The product sets 127 include category groupings of items that will be monitored through the templates 146. The category groupings may include groups of items the user wishes to cool or heat, such as proteins, liquids, sauces, vegetables, ice creams, pharmaceuticals, etc. For example, the user may need to monitor the temperatures of grilled pork, beef, and chicken. If the user desires, the user can group these three different types of meats as a protein product set 127, with each type of meat saved as a "product set item," and save this information under a new template 146. To this end, the new template 146 can be used to monitor these "proteins," and the user may use the new template 146 when monitoring these three types of meats.

The user may create multiple product sets 127 and designate as many product set items as may be desired under a given product set 127. In addition, the predictive logging application 170 may utilize the predictive analytics service 176 to train machine learning models of what product set items the user puts into a given product set 127. For example, a user that deals with a large volume of chicken may initially scan or activate a machine-readable identifier on a bagged chicken item 108 when it is received into a store to enter it into the system. Afterwards, the user may manually enter the bagged chicken item 108 as a product set item under a "protein" product set 127. The predictive logging application 170 may train machine learning models, so that the next time the user scans a similar machine-readable identifier for another bagged chicken item 108, it is automatically entered into the "proteins" product set 127.

FIG. 6 depicts a template modification user interface 600, where a user may customize the various templates 146. For example, a "cooling log" template 146 is selected in FIG. 6. A "proteins" product set 127 is currently selected, but the user may add as many product sets as desired. In addition, the user ay specify the rules 149, which pertain either to a target temperature by time rule or a temperature by time duration rule. As discussed above, the rules 149 may be discontinuous. For example, the target temperature by time rule 149 may be a temperature threshold that must be achieved in three hours. However, those three hours may be a continuous three hours or discontinuous over the course of a single day or multiple days depending on the preferences of the user. Similarly, the temperature by time duration rule 149 may be continuous or discontinuous over the course of a single day or multiple days as well. The user may add multiple target temperature by time rules 149 and multiple temperature by time duration rules 149 to a single template 146.

In the template modification user interface 600, the user may select whether the various templates 146 correspond to an automatic template or a manual template. Further, the user ay specify the corrective actions 143 to be triggered in a selected template 146 for each rule 149 created. The corrective actions 143 include selectable options displayed on the client device 106 when the rules 149 are broken. For example, the cooling log template 146 shown has a target temperature by time corrective action 143 and a time duration corrective action 143. The target temperature by time corrective actions 143 include options that state "reheat item and begin new cooling log" and "discard product." The time duration corrective action 143 includes an option that states "discard product," It should be emphasized that the "reheat item and begin new cooling log" option may only be available to the user if the item 108 being cooled has been in a cooling process for less than two hours, per FDA regulations. If more than two hours has passed, the user may have to discard the item 108.

If the user selects a manual type of template, the user may also set a manual alert frequency in the template modification user interface 600. In addition, the user may also fill in a description for the various templates 146 in the "description box," as shown in FIG. 6. The template modification user interface 600 also allows the user to customize the various templates through further configuration options such as allow user comments, add user names, and add final cooking time and temperatures.

FIG. 7 depicts an example automatic timed log user interface 700 that is used to initiate an automatic timed log. In the automatic timed log user interface 700, a user may select from the various templates 146 stored in the data store 115 and the one or more sensors 109 to use in the automatic timed log. For example, the user has selected the "cooling log" template 146 and "sensor #1" 109 in the automatic timed log user interface 700. The user may also supply additional item names, comments, and user names to be used in the monitoring process.

Figure 9:
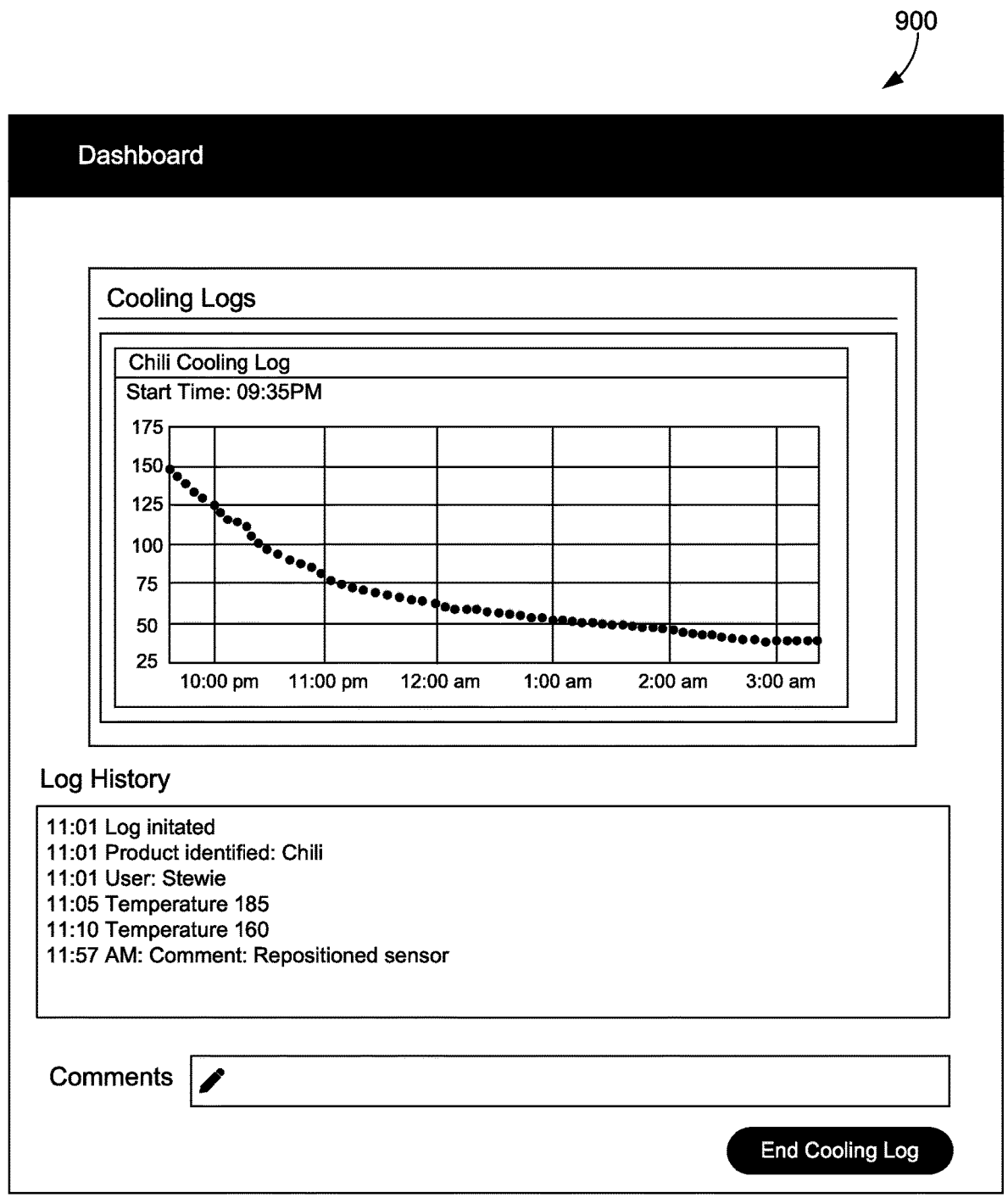
FIG. 9 illustrates an example log history user interface rendered on the client device showing a graphical log history and a detailed log history of an item monitored with a template selected in the automatic timed log user interface shown in FIG. 7.

FIG. 8 depicts an example manual timed log user interface 800 that is utilized to initiate a manual timed log. The steps needed to initialize a manual timed log are similar to that of an automatic timed log, as discussed above. However, a user does not need to select the sensors 109 to be used in the monitoring process since the user will manually temp the item 108, FIG. 9 depicts an example log history user interface 900 showing a dashboard with a graphical logging history of received temperature measurements 121 and a detailed logging history. The example log history user interface 800 shows a graphical temperature log of chili 108, through utilization of the"cooling log" template 146 selected in the example automatic timed log user interface 700. The dots shown in the graphical logging history represent temperature measurements 121 that were received as a function of time. The predictive logging application 170 may be configured to compute a cooling rate for the chili 108 with the temperature measurements 121. In addition, the predictive logging application 170 may employ the predictive analytics service 176 to project a predicted slope 166 of the chili 108. In addition, the detailed log history displays information that may be useful to the user, such as what time the logging process initiated, what the item 108 is, who the user is, the temperature measurements 121 that were taken at set intervals, and any comments the user may want to provide.

Figure 10:
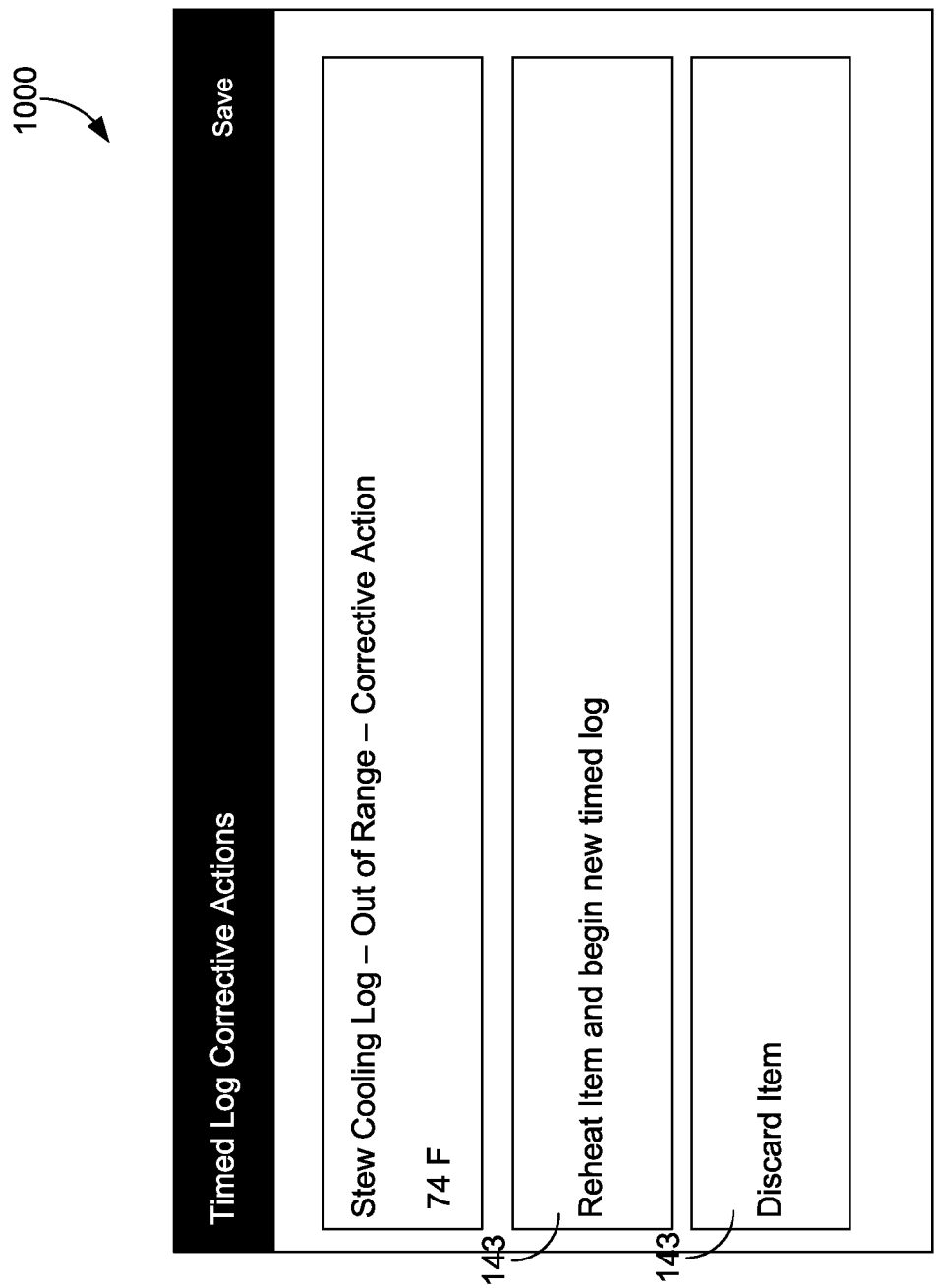
FIG. 10 illustrates an example corrective actions user interface rendered on the client device that triggers when rules specified in a template are not met.

FIG. 10 depicts an example corrective actions user interface 1000 that may trigger when the rules 149 are broken. For example, if the rule 149 specifies that the item 108 cannot be between 135° F. and 80° F. for more than 1.5 hours in a single day, and each temperature measurement 121 taken between 1:15 PM and 3:00 PM in a single day is 90° F. the corrective actions user interface 900 would be rendered on the client device 106. As shown, the corrective actions user interface 900 shows two corrective action options: to reheat the item 108 and begin a new timed log or discard the item 108. Although reheating the item 108 and beginning a new timed log option may be displayed, users may not select this option unless the item 108 has not been cooled for more than two hours, per FDA guidelines. In some embodiments, triggering of the corrective actions 143 may automatically halt or terminate the current timed log.

Figure 11:
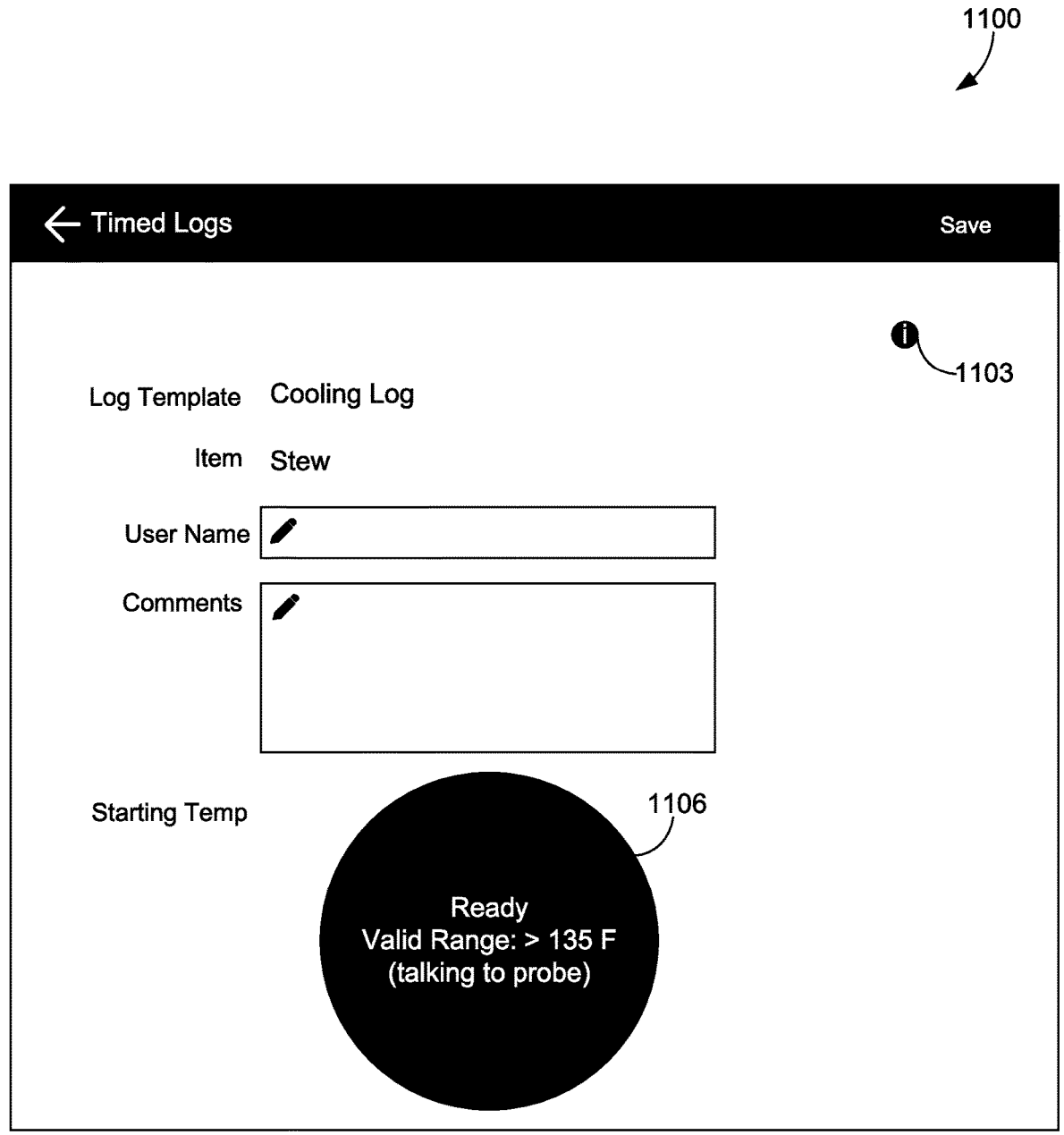
FIG. 11 illustrates an example user interface rendered on the client device that can be utilized to take temperature measurements for a manual timed log.

FIG. 11 depicts an example manual temperature probing user interface 1100 that may be utilized before taking a temperature measurement for a manual timed log. In the manual temperature probing user interface 1100, a user may provide a user name or any comments in the "user name" and "comments" box as shown. An information icon 1103 is also shown. Clicking on the info icon 1103 may bring up a pop up window on the client device 106 with a description of the manual timed log and any instructions the user may have provided. For instance, details relating to the "cooling log" template 146 may be provided, such as the rules 149 and the corrective actions that are configured for the Cooling Log template 146 (FIG. 6). A circular icon 1106 indicates the status of the sensors 109 in communication with the client device 106. A ready indication in the circular icon 1106 indicates that temperature measurements are ready to be taken. In addition, the circular icon 1106 may display the rules 149 that are applied to the various templates 146.

Figure 12:
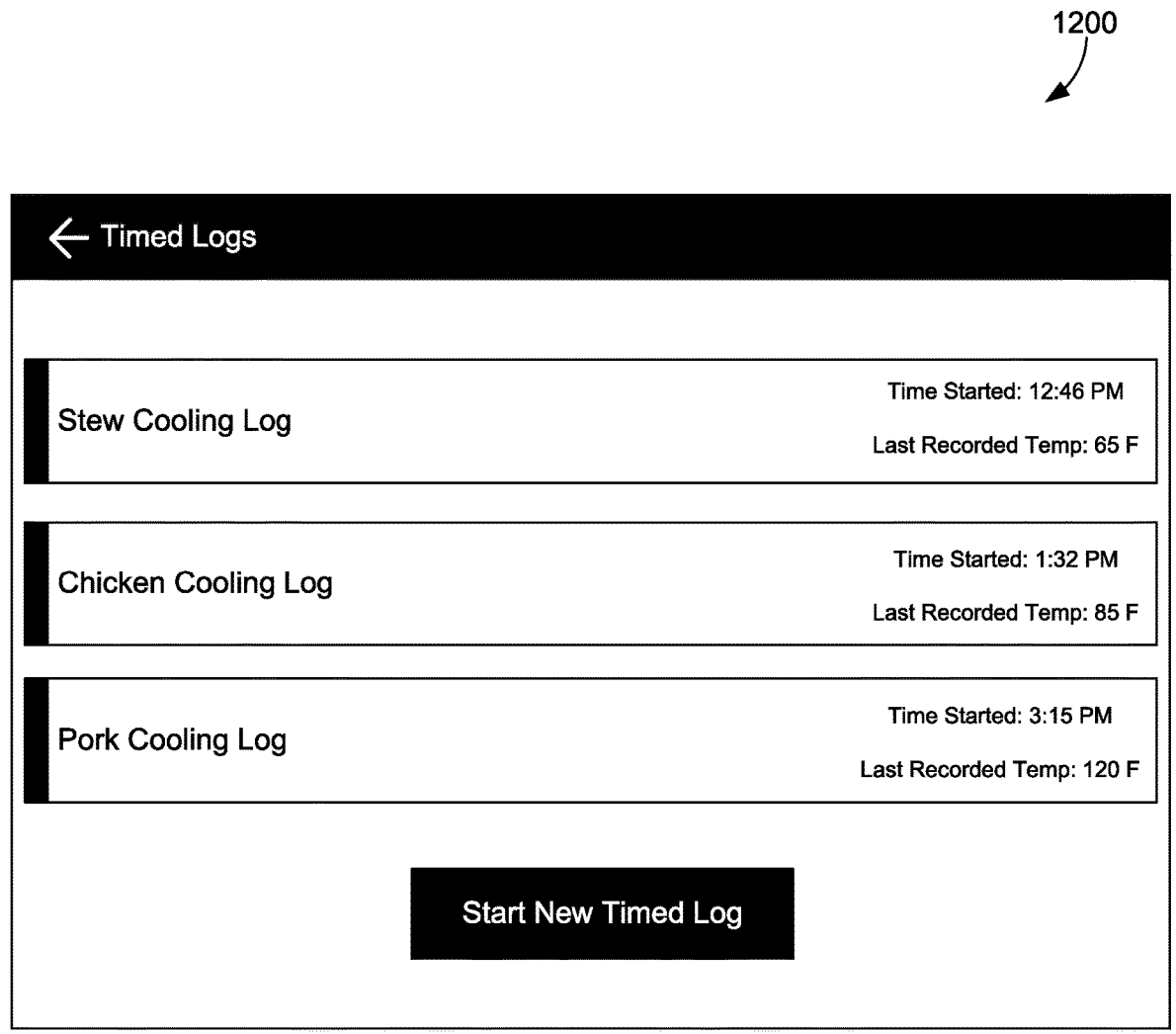
FIG. 12 illustrates an example timed log selection user interface rendered on the client device that can be utilized to view data of various timed logs created by a user.

FIG. 12 shows an example timed log selection user interface 1200 that can be utilized to view data of various timed logs. The timed log selection user interface shows various timed logs a user may create. For example, FIG. 12 shows a stew cooling log, a chicken cooling log, and a pork cooling log, Each of these logs may share a common template 146 or utilize different templates 146. The example timed log selection user interface 1200 may also show the time started and the last recorded temperature for each timed log. Selecting an individual timed log may bring up detailed information regarding that log, such as the template 146 that was used, full range of temperature measurements 121 taken, computed temperature change rates, computed predicted slopes 163, and predefined slopes 163 that were compared.

Figure 13:
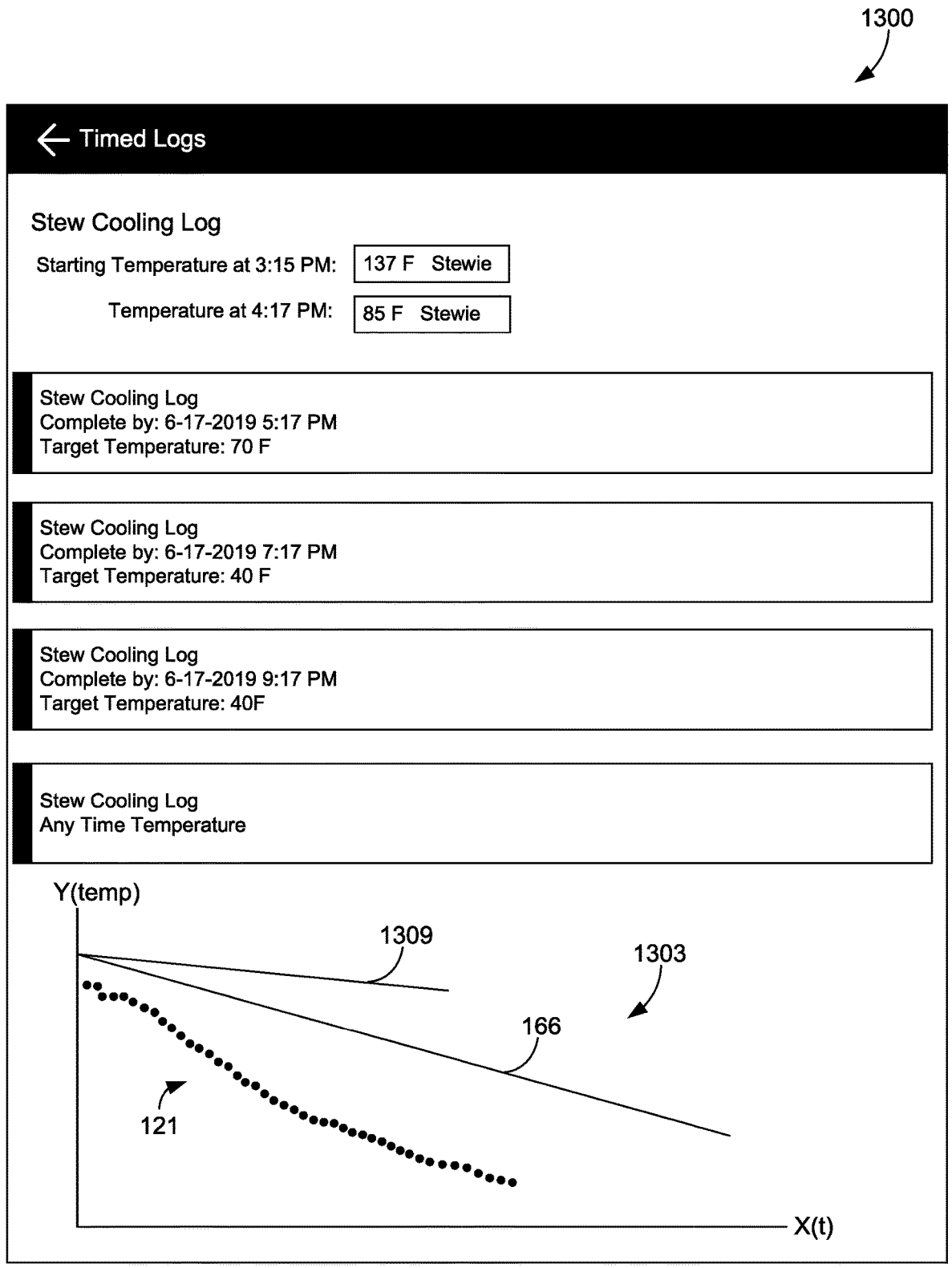
FIG. 13 illustrates an example detailed timed log user interface rendered on the client device after a user selects a timed log shown in the example timed log selection user interface shown in FIG. 12.

FIG. 13 depicts an example detailed timed log user interface 1300, which may be rendered on the client device 106 after a user selects a timed log shown in the example timed log selection user interface 1200 (FIG. 12). For example, the detailed timed log user interface 1300 shows detailed information about the "stew cooling log" shown in FIG. 12. The detailed timed log user interface 1300 lists all monitoring processes associated with a certain timed log. In the example shown, there are four monitoring processes associated with the stew cooling log. For each monitoring process, a user may be able to configure the template 146 to be utilized. For example; the first stew cooling log has a target temperature 149 of 70° F. to be completed by "6-17-2019 5:17 PM", while the second stew cooling log has a target temperature 149 of 40° F. to be completed by "6-17-2019 7:17 PM," The user may utilize the "cooling log" template for both of these monitoring processes, although different rules 149 may be applied to each monitoring process. In some embodiments, a user may select a new template 146 for each monitoring process. Further, if the user wants to manually take a temperature reading, the user may select the "any time temperature" monitoring process, as shown in FIG. 13.

The example detailed timed log user interface 1300 can also display a live graph 1303 showing various parameters based on the temperature measurements 121 that are received. The live graph 1303 may display the temperature measurements 121, temperature change rates, the predicted slope 166, and/or the predefined slope 163 of the item 108. For example, the live graph 1303 in FIG. 13 shows stew temperature measurements 121 of stew 108 that are plotted in the live graph 1303 as a function of time. The live graph 1303 may also display a computed cooling rate 1309, which can be the average cooling rate based on the stew temperature measurements 121. The computed cooling rate 1309 can update in real time as more temperature measurements are received and can also be affected by environment data 160 pertaining to the stew 108. The live graph 1303 also displays a predicted slope 166 the stew 108 is expected to follow. The predictive logging application 170 may utilize machine learning models based on available data to project the predicted slope 166. In some embodiments, the live graph 1303 may also display the predefined slope 163.

Figure 14:
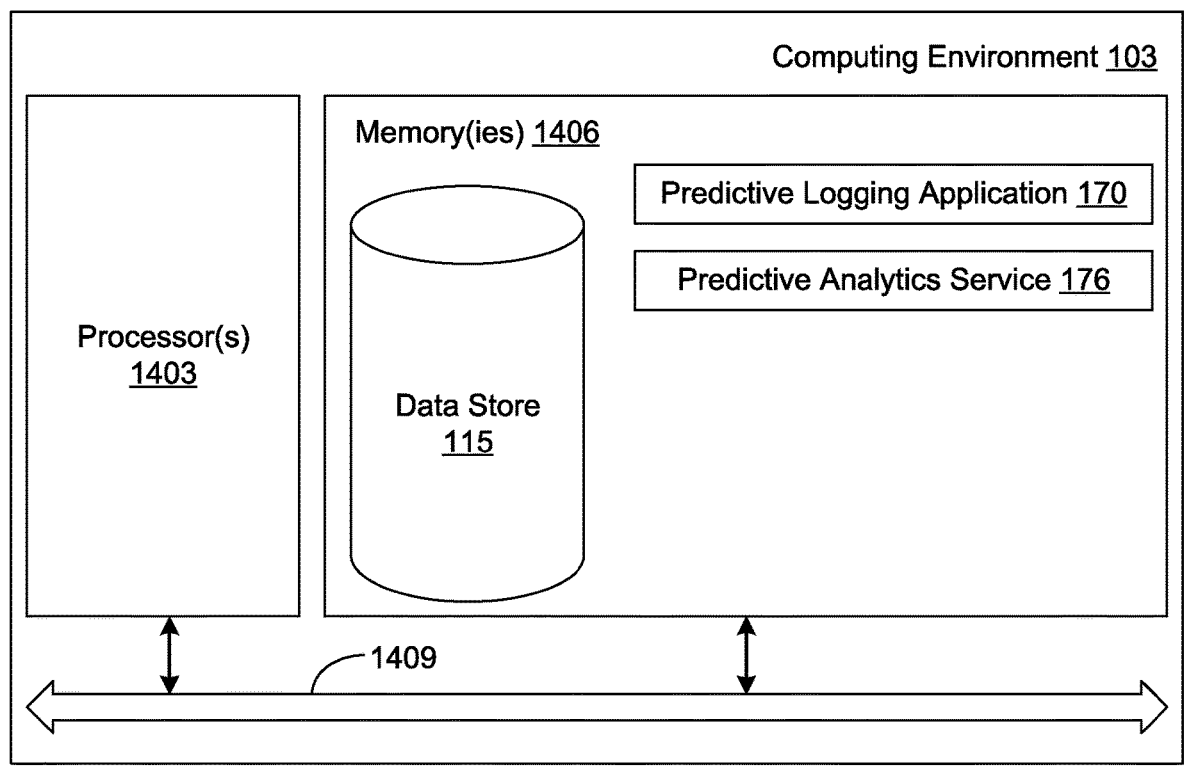
FIG. 14 is a schematic block diagram that provides one example illustration of a computing environment employed in the networked environment of FIG. 1 according to various embodiments of the present disclosure.

With reference to FIG. 14, shown is a schematic block diagram of the computing environment 103 according to an embodiment of the present disclosure. The computing environment 103 includes at least one processor circuit, for example, having a processor 1403 and a memory 1406, both of which are coupled to a local interface 1409. To this end, the computing environment 103 may comprise, for example, at least one server computer or like device. The local interface 1109 may comprise, for example, a data bus with an accompanying address/control bus or other bus structure as can be appreciated.

Stored in the memory 1406 are both data and several components that are executable by the processor 1403. In particular, stored in the memory 1406 and executable by the processor 1403 are the predictive logging application 170, the predictive analytics service 176, and potentially other applications. Also stored in the memory 1406 may be the data store 115 and other data. In addition, an operating system may be stored in the memory 1406 and executable by the processor 1403.

It is understood that there may be other applications that are stored in the memory 1406 and are executable by the processor 1403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components, Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM); an erasable programmable read-only memory (EPROM), an electrically erasable programmable read-only memory (EEPROM), or other like memory device.

Also, the processor 1403 may represent multiple processors 1403 and/or multiple processor cores, and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although the predictive logging application 170, the predictive analytics service 176, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the predictive logging application 170. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the predictive logging application 170 and the predictive analytics service 176, that comprises software or code can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example; magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. AH such modifications and variations are intended to be included herein within the scope of this disclosure and protected by the following claims.

Therefore, at least the following is claimed:

1. A non-transitory computer-readable medium embodying a program executable in at least one computing device, wherein when executed, the program causes the at least one computing device to at least:

process a configurable template to initiate a timed log monitoring process, the configurable template specifying at least one item that is to be monitored and a set of rules to be applied in monitoring the at least one item, the set of rules comprising a target threshold;

receive a plurality of temperature measurements of the at least one item during the timed log monitoring process and process the plurality of temperature measurements to compute a temperature change rate of the at least one item;

determine, based at least in part on the temperature change rate, a batch optimization parameter of the at least one item, the batch optimization parameter comprising an optimal quantity of the at least one item that can be placed in a cooling location, the optimal quantity being a largest quantity that can be stored in the cooling location while meeting the target threshold; and cause a quantity of the at least one item stored in the cooling location to be adjusted to the optimal quantity based at least in part on the batch optimization parameter.

2. The non-transitory computer-readable medium of claim 1, wherein the target threshold comprises a target duration of a temperature range.

3. The non-transitory computer-readable medium of claim 2, wherein the target duration of a temperature range can be discontinuous over a single day or multiple days.

4. The non-transitory computer-readable medium of claim 1, wherein when executed, the program further causes the at least one computing device to predict whether the at least one item will meet the target threshold based at least in part on a comparison of the temperature change rate to a predefined slope of the at least one item stored in a data store, the predefined slope being a temperature curve the at least one item is expected to follow during the timed log monitoring process.

5. The non-transitory computer-readable medium of claim 1, wherein determining the batch optimization parameter of the at least one item occurs based at least in part on an analysis of historical item data related to the at least one item, the historical item data comprising temperature measurements of a related item and temperature change rates of the related item from one or more prior timed log monitoring processes.

6. The non-transitory computer-readable medium of claim 1, wherein when executed, the program further causes the at least one computing device to determine an optimal cooling section within the cooling location that would increase the temperature change rate of the at least one item.

7. A system, comprising:
a computing device comprising at least one hardware processor; and
instructions embodied in a non-transitory computer-readable medium executable in the computing device that when executed cause the computing device to at least:
process a configurable template to initiate a timed log monitoring process, the configurable template specifying at least one item that is to be monitored and a set of rules to be applied in monitoring the at least one item, the set of rules comprising a target threshold;
receive a plurality of temperature measurements of the at least one item during the timed log monitoring process and process the plurality of temperature measurements to compute a temperature change rate of the at least one item;
determine, based at least in part on the temperature change rate, a batch optimization parameter of the at least one item, the batch optimization parameter comprising an optimal quantity of the at least one item that can be placed in a cooling location, the optimal quantity being a largest quantity that can be stored in the cooling location while meeting the target threshold; and
cause a quantity of the at least one item stored in the cooling location to be adjusted to the optimal quantity based at least in part on the batch optimization parameter.

8. The system of claim 7, wherein the target threshold comprises a target duration of a temperature range.

9. The system of claim 8, wherein the target duration of a temperature range can be discontinuous over a single day or multiple days.

10. The system of claim 7, wherein when executed the instructions further cause the computing device to at least predict whether the at least one item will meet the target threshold based at least in part on a comparison of the temperature change rate to a predefined slope of the at least one item stored in a data store, the predefined slope being a temperature curve the at least one item is expected to follow during the timed log monitoring process.

11. The system of claim 7, wherein determining the batch optimization parameter of the at least one item occurs based at least in part on an analysis of historical item data related to the at least one item, the historical item data comprising temperature measurements of a related item and temperature change rates of the related item from one or more prior timed log monitoring processes.

12. The system of claim 7, wherein when executed the instructions further cause the computing device to at least determine an optimal cooling section within the cooling location that would increase the temperature change rate of the at least one item.

13. A computer-implemented method, comprising:
processing a configurable template to initiate a timed log monitoring process, the configurable template specifying at least one item that is to be monitored and a set of rules to be applied in monitoring the at least one item, the set of rules comprising a target threshold;
receiving a plurality of temperature measurements of the at least one item during the timed log monitoring process and process the plurality of temperature measurements to compute a temperature change rate of the at least one item;
determining, based at least in part on the temperature change rate, a batch optimization parameter of the at least one item, the batch optimization parameter comprising an optimal quantity of the at least one item that can be placed in a cooling location, the optimal quantity being a largest quantity that can be stored in the cooling location while meeting the target threshold; and
causing a quantity of the at least one item stored in the cooling location to be adjusted to the optimal quantity based at least in part on the batch optimization parameter.

14. The computer-implemented method of claim 13, wherein the target threshold comprises a target duration of a temperature range.

15. The computer-implemented method of claim 14, wherein the target duration of a temperature range can be discontinuous over a single day or multiple days.

16. The computer-implemented method of claim 13, further comprising predicting whether the at least one item will meet the target threshold based at least in part on a comparison of the temperature change rate to a predefined slope of the at least one item stored in a data store, the predefined slope being a temperature curve the at least one item is expected to follow during the timed log monitoring process.

17. The computer-implemented method of claim 13, wherein determining the batch optimization parameter of the at least one item occurs based at least in part on an analysis of historical item data related to the at least one item, the historical item data comprising temperature measurements of a related item and temperature change rates of the related item from one or more prior timed log monitoring processes.

18. The computer-implemented method of claim 13, further comprising determining an optimal cooling section within the cooling location that would increase the temperature change rate of the at least one item.

19. The computer-implemented method of claim 13, further comprising storing the batch optimization parameter in the configurable template.

20. The computer-implemented method of claim 13, wherein causing a quantity of the at least one item stored in the cooling location to be adjusted to the optimal quantity based at least in part on the batch optimization parameter further comprises generating a user notification of the optimal quantity.

\* \* \* \* \*